United States Patent [19]

Sato

[11] Patent Number: 4,674,063
[45] Date of Patent: Jun. 16, 1987

[54] INFORMATION PROCESSING APPARATUS HAVING A SEQUENCE CONTROL FUNCTION

[75] Inventor: Yoshikuni Sato, Tokyo, Japan

[73] Assignee: NEC Corporation, Tokyo, Japan

[21] Appl. No.: 542,969

[22] Filed: Oct. 18, 1983

[30] Foreign Application Priority Data

Oct. 18, 1982 [JP] Japan ............................. 57-182313
Jul. 20, 1983 [JP] Japan ............................. 58-132311

[51] Int. Cl.⁴ ............................................. G06F 9/42
[52] U.S. Cl. ................................................ 364/900
[58] Field of Search ... 364/200 MS File, 900 MS File

[56] References Cited

U.S. PATENT DOCUMENTS

| | | | |
|---|---|---|---|
| 3,408,630 | 10/1968 | Packard et al. | 364/200 |
| 3,764,988 | 10/1973 | Onishi | 364/200 |
| 3,886,523 | 5/1975 | Ferguson et al. | 364/200 |
| 3,967,104 | 6/1976 | Brantingham | 364/900 |
| 3,979,729 | 9/1976 | Eaton et al. | 364/200 |
| 3,991,404 | 11/1976 | Brioschi et al. | 364/200 |
| 4,003,033 | 1/1977 | O'Keefe et al. | 364/200 |
| 4,099,229 | 7/1978 | Kancler | 364/200 |
| 4,161,778 | 7/1979 | Getson et al. | 364/200 |
| 4,179,737 | 12/1979 | Kim | 364/200 |
| 4,246,644 | 1/1981 | Flynn | 364/200 |
| 4,254,461 | 3/1981 | Chemla et al. | 364/200 |

Primary Examiner—David Y. Eng
Attorney, Agent, or Firm—Sughrue, Mion, Zinn, Macpeak & Seas

[57] ABSTRACT

An information processing apparatus having a jump operation function comprises a memory storing a first type instruction containing an operation code which designates an operation other than a jump operation and a control code which designates the jump operation and a second type instruction containing a jump address, a control circuit coupled to the memory and generating a control signal or signals to be used to execute the operation designated by the operation code and a jump operation signal according to the control code, and an addressing circuit coupled to the memory and the control circuit and applying the jump address contained in the second type instruction to the memory according to the jump operation signal generated at the same time when the control signal or signals are generated.

8 Claims, 15 Drawing Figures

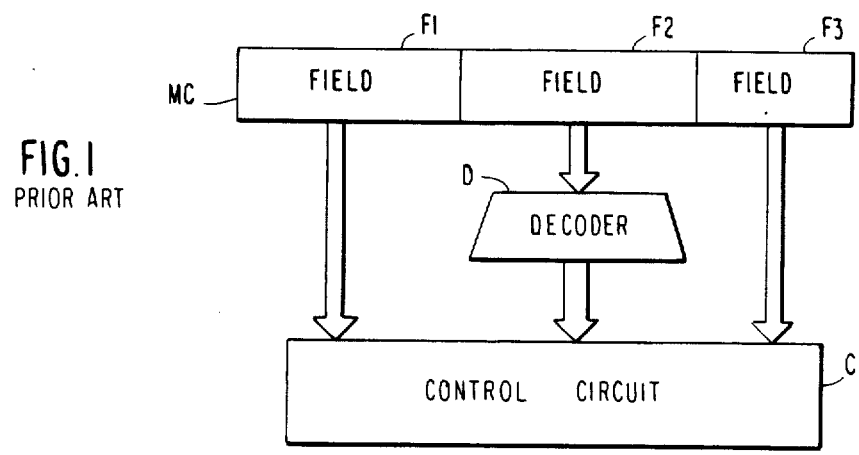
FIG. 1 PRIOR ART
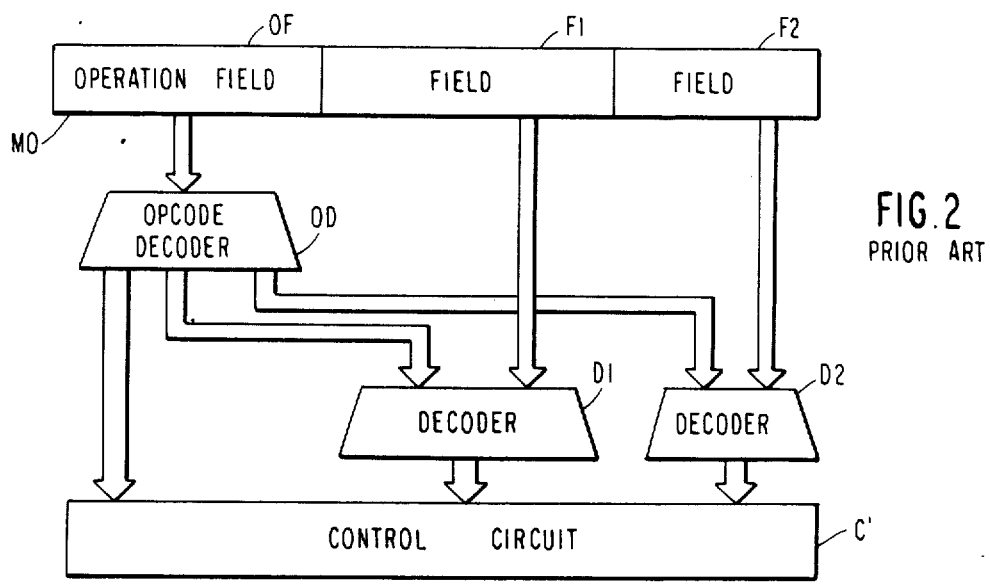
FIG. 2 PRIOR ART
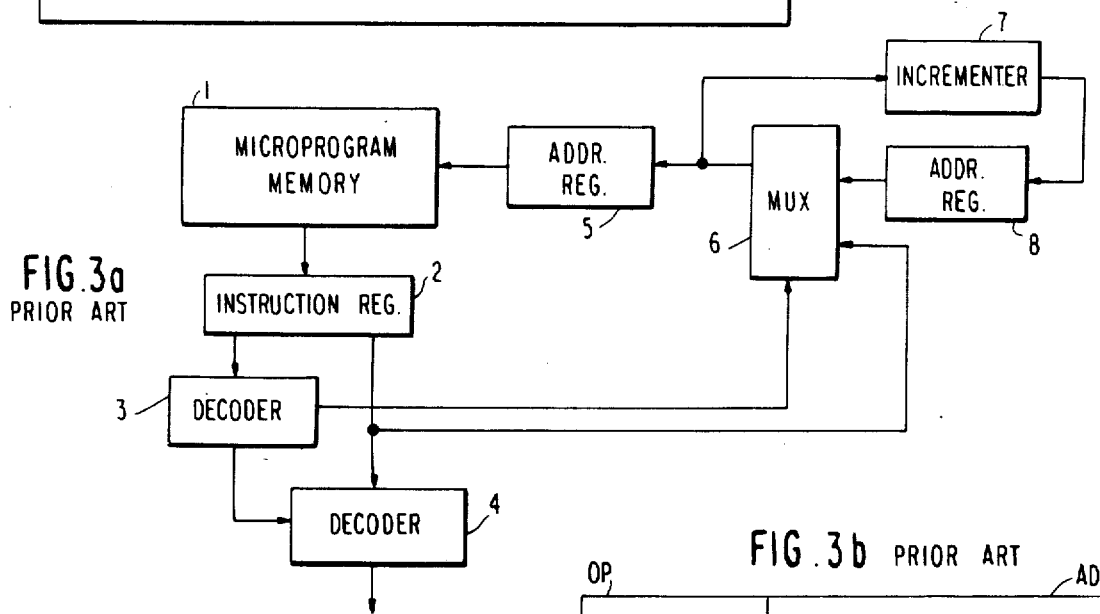
FIG. 3a PRIOR ART
FIG. 3b PRIOR ART

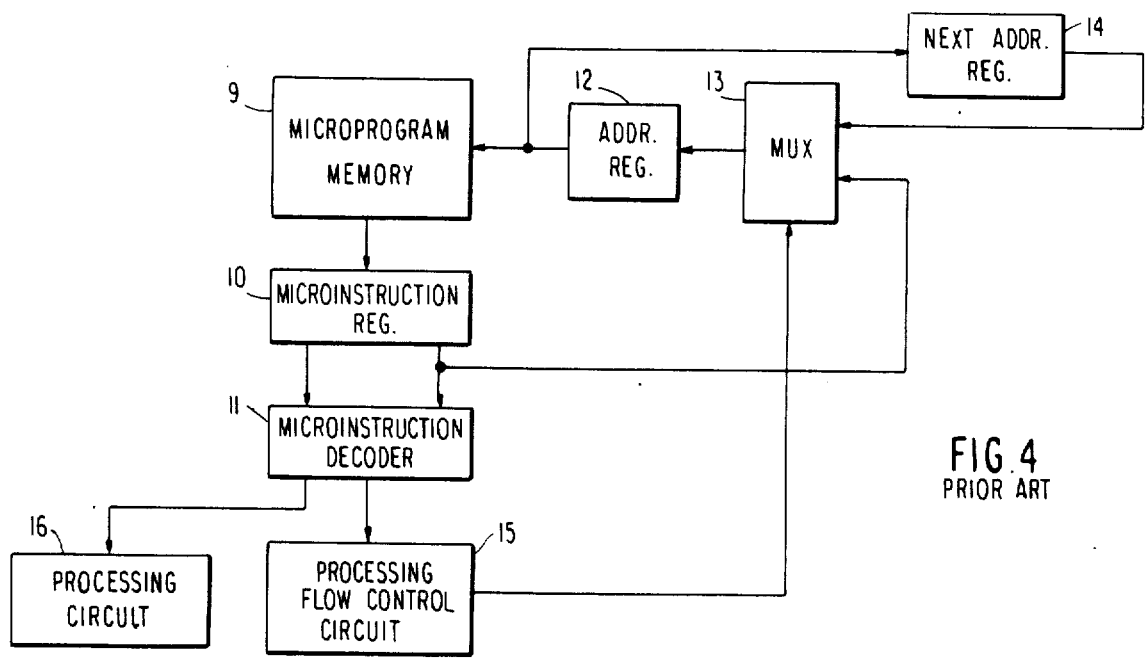
FIG. 4
PRIOR ART
FIG. 5a
PRIOR ART
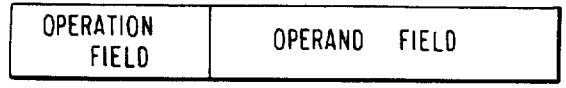
FIG. 5b
PRIOR ART
FIG. 6a
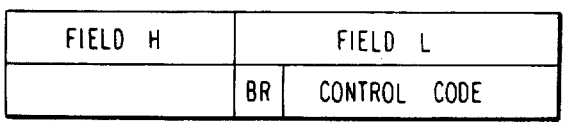
FIG. 6b
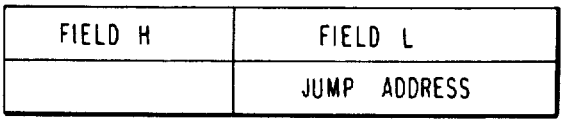

INFORMATION PROCESSING APPARATUS HAVING A SEQUENCE CONTROL FUNCTION

BACKGROUND OF THE INVENTION

This invention relates to an information processing apparatus having a sequence control junction, and more particularly to an instruction control processor in which instructions are derived from a program memory and a program is executed according to a sequence of the derived instructions and an instruction control system used therein.

DESCRIPTION OF THE PRIOR ART

Microprogramming is a computer architecture well known as an instruction control system and is a most useful interface between the hardware and the software of a computer. In this type of system, one macro instruction is divided into a plurality of small steps, and each step is described as a micro instruction, respectively. A group of micro instructions is called a microprogram, and a memory storing the micro instructions is called a microprogram memory. The microprogramming technique is generally used as a firmware.

Two types of micro instructions or microcode have been proposed in the prior art; one is a horizontal type and the other is a vertical type. A horizontal type micro instruction consists of a plurality of bits each of which corresponds individually to each of a plurality of control gates in an arithmetic processing unit and a process flow or sequence control unit, and each bit directly controls a data path (e.g. a gate of a register). There are two alternative implementations for the horizontal type instruction. One provides direct control in which the bit itself is a micro operation signal, and the other provides encoded control in which one micro instruction is divided into a plurality of fields each of which are coupled to respective decoders and decoded outputs as used as micro operation signals. However, in a high level computer having a large number of control gates, a correspondingly large number of bits are required for each micro instruction. Therefore, the horizontal type micro instruction control system is technically feasible on a high speed computer but is not practical.

On the other hand, a vertical type micro instruction is divided into an operation field defining an operation code and at least one operand field defining an operand value. The operation code is used to designate a processing operation and is applied to a decoder. The decoded outputs are used as micro operation signals. Therefore, since the number of bits per one micro instruction can be small, the vertical type is of more practical use than the horizontal type. However, at least one decoding is always required for executing one vertical micro instruction. Therefore, there is a disadvantage that the processing speed is very slow for vertical microcode. For example, a jump (or branch) instruction is one micro instruction. The jump instruction changes processing flow and is used especially to control an address jump statement. A jump code for designating a jump operation is set in the operation field, and a jump address is set in the operand field. After the instruction is read out of a program memory (ROM) and is loaded into an instruction register, first the code is decoded as a jump code by a decoder coupled to the operation field, and secondly the jump address is sent to a program memory address register according to at least one decoded output (a jump operation control signal) produced by the decoder. Generally, since the next address produced by a sequential address generator is set in the program memory address register, an address controller must inhibit the normal generation of the next address for the jump operation. Therefore, a multiplexer is provided at the input of the address register, and the jump address is selected by the multiplexer at the occurrence of the jump operation control signal and the jump address is then transferred to the address register.

As described above, execution of the jump instruction requires both a decoding operation and a multiplexing operation. Therefore, the processing speed of the vertical type instruction is reduced even more. In addition to this shortcoming, when the jump instruction is executed, a processing unit such as an arithmetic unit and an information transfer unit can not be used, that is, the processing unit is necessarily held in an idle state. This requirement does not apply to a processing flow control unit. Therefore, the prior art vertical microcase has a shortcoming that processing efficiency of the processing unit is very poor.

These shortcomings cannot be solved, even if an instruction look ahead technique is adopted, unless the decoding operations are omitted. Further, it is clear that the same shortcomings will occur in the case where a micro instruction consists of a plurality of words. Particularly, the decoding operation limits processing speed of not only the jump instruction but also other micro instructions. Moreover, micro instructions other than the jump instruction which do not use the processing unit also cause an idle state for the processing unit.

SUMMARY OF THE INVENTION

It is accordingly a primary object of the present invention to provide an information processing apparatus which executes an instruction at a high speed.

It is another object of the present invention to provide an information processing apparatus in which the processing efficiency of a processing unit is improved.

It is still another object of the present invention to provide a microprogramming control system having an improved processing procedure.

It is still another object of the present invention to provide a microprocessor in which both a first type micro instruction for a processing unit and a second type micro instruction for a sequence control unit can be simultaneously executed.

An instruction control system according to the present invention includes two instruction formats. One is a first type instruction which has an operation field which contains an operation code for controlling a processing circuit, an operand field which contains an operand code used by the processing circuit, and a control field which contains a control code for controlling a sequence control circuit. The other is a second type instruction having a data code for designating program flow. The first type instruction is accessed in a preceding instruction, while the second type instruction is accessed in a following instruction. The first type instruction is first decoded and is transferred to the processing circuit. In this cycle, the control code of the first type instruction is simultaneously decoded. The data code of the second type instruction is transferred to the sequence control circuit according to the decoded signal of the control code. Namely, the control code of the first type instruction and the data code of the second type instruction are a pair of single instructions (for example, a jump instruction or a branch instruction) for controlling a sequence of a program flow, and are independently contained in the first type instruction and in the second type instruction, respectively. The control code contained in a preceding instruction (that is, the first type instruction) is decoded within the operation code decoding cycle of the preceding instruction.

According to the present invention, since an independent decoding cycle for the control code is not required, high speed processing can be achieved. Further, when the second type instruction includes another operation code, this operation code can be simultaneously executed with the processing flow control operation. Therefore, high processing efficiency can be established in the present invention.

In the case that the control code in a first type instruction is a jump (or branch) code and that the data code in a second type instruction is a jump address, the jump code is decoded in a preceding instruction decoding cycle, so that the jump address is immediately transferred to the sequence control circuit such as an address register.

Further, the first type instruction and the second type instruction may be simultaneously read out of an instruction memory. In this case, these two instructions can be executed in the same machine cycle at high speed.

BRIEF DESCRIPTION OF THE DRAWINGS

The above and other objects of the present invention are achieved in the illustrative embodiments as described with respect to the Figures in which:

FIG. 1 is a block diagram of a prior art data processor using a horizontal type microprogramming;

FIG. 2 is a block diagram of a prior art data processor using vertical type microprogramming;

FIG. 3(a) is a block diagram of a prior art data processor which controls a jump (branch) instruction;

FIG. 3(b) is a jump instruction format of a prior art vertical type microcode;

FIG. 4 is a block diagram of a prior art data processor with a vertical type microprogramming;

FIG. 5(a) is a prior art control instruction format and FIG. 5(b) is a prior art jump instruction format;

FIG. 6(a) is a control instruction format and FIG. 6(b) is a jump instruction format of the present invention;

DETAILED DESCRIPTION OF THE PRIOR ART

Figure 7:
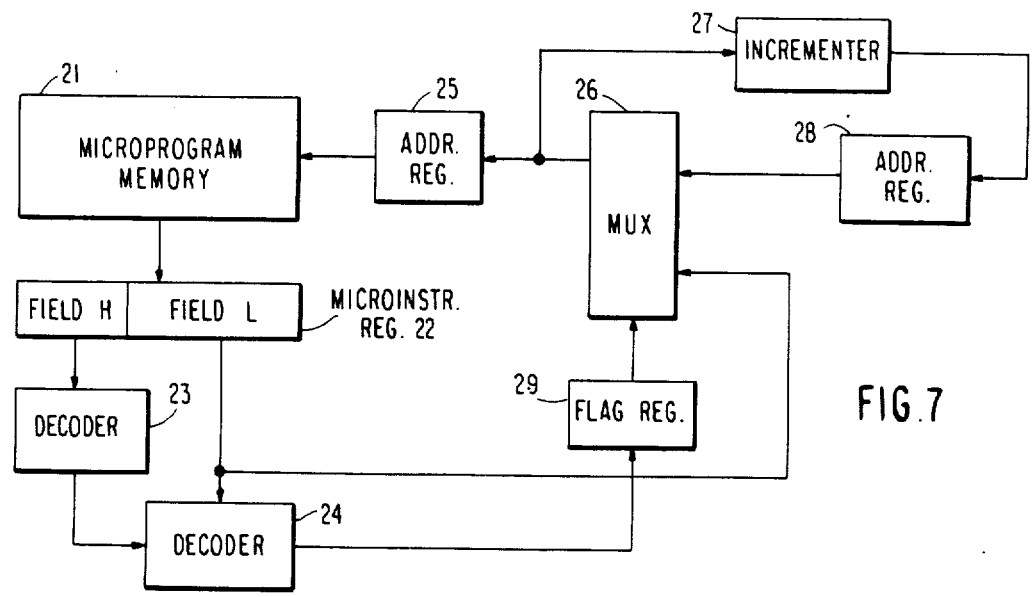
FIG. 7 is a block diagram of a part of a data processor of the present invention.

FIG. 1 shows a partial block diagram of a prior art information processor using horizontal type microprogramming, in which an instruction register, a decoder and a control circuit are included. In this figure, a one word micro instruction register contains three fields, $F_1$, $F_2$, and $F_3$, into which a plurality of micro codes MC are loaded from a memory (not shown). A plurality of bit locations are assigned to each field. The fields $F_1$ and $F_3$ are directly connected to a control circuit C, while the field $F_2$ is coupled to the control circuit C via a decoder D. The control circuit is generally coupled to a processor portion (not shown) such as an arithmetic circuit and a data transfer circuit and a processing sequence control portion (not shown) for controlling the sequence of process execution. Micro code in the fields $F_1$ and $F_3$ are directly applied to the control circuit C, while micro code in the field $F_2$ is applied to the decoder D, from which a decoded output is transferred to the control circuit C. That is, each field independently controls the control circuit C.

In this horizontal type microprogramming, since the number of control gates in the control circuit C is almost equal to the number of bits in the instruction register, the control circuit C can immediately respond to each micro code, and therefore the processing portion and the processing sequence control section controlled by outputs of the control circuit C can execute a program at high speed. However, since a large number of control gates are required in an advanced computer, the length of one word instruction in this format would become very long. Therefore, this type of microcode is not practical for advanced computers.

Vertical type microprogramming produces an improved system in which many shortcomings of horizontal type microprogramming are solved. FIG. 2 shows a block diagram of prior art vertical type microprogramming using a one word instruction register, decoders and a control circuit C' are included. The one word instruction register has three fields OF, $F_1$ and $F_2$, the same as for horizontal type microprogramming. However, an operation code for designating the type of operation of the instruction loaded in the register is contained in the field OF. Two operands are contained in the fields $F_1$ and $F_2$. Each field is connected to its respective decoder. An operation code decoder OD connected to the operation field OF is connected to the control circuit C and two decoders $D_1$ and $D_2$. Decoders $D_1$ and $D_2$ receive operands from the operand fields $F_1$ and $F_2$ and a part of the decoded output from the operation decoder OD. The decoded outputs of decoders $D_1$ and $D_2$ are applied to the control circuit C. Specifically, the operands F and F are decoded together with an output of the operation code decoding acting as control. Therefore, a vertical type instruction can be implemented with fewer bits than a corresponding horizontal type instruction. However, since a plurality of decoding steps (two steps in the FIG. 2) are required, vertical type microprogramming has the shortcoming that processing speed is very slow.

This shortcoming will be shown more clearly by the example of a jump instruction. The jump instruction is a micro instruction and changes the sequence of execution flow. This instruction is generally used in the sequence control section and is not used in the processing section. FIG. 3(a) shows a block diagram of a part of a data processor using vertical type microprogramming. The jump instruction is stored in a microprogram memory 1 together with other micro instructions. An address input of this memory is coupled to an address register 5, and a data output of it is coupled to an instruction register 2 which can be loaded with a one word instruction. The instruction register 2 and two decoders 3 and 4 are the same circuits shown in FIG. 2. The operation code decoder 3 is coupled to an operation field of the register 2, and the decoder 4 is coupled to an operand field of the register 2 as well as to an output of the operation code decoder 3. The control circuit C in FIG. 2 is omitted from FIG. 3. The input of the address register 5 is connected to a multiplexer 6 which receives two kinds of addresses, one kind from a next address register 8 and the other kind from the operand field of the instruction register 2. Sequential addresses are produced by an incrementer 7 and are sent to one input of the multiplexer 6 via the next address register 8. On the other hand, a jump address is contained in the operand field of the instruction register 2 and is transferred to the other input of the multiplexer 6.

FIG. 3(b) shows a jump instruction code format of the prior art. The jump instruction has two micro codes one of which is an jump operation code in an operation code field and the other of which is a jump address in spanning two operand fields. The jump address is loaded into the instruction register 2 according to an address of the next address register 8.

In normal operation using sequential addresses, when the jump instruction shown in FIG. 3(b) is read out of the memory and is loaded into the instruction register 2, the operation code decoder 3 decodes the jump operation code of the operation field and produces a jump operation signal. As the result, the normal mode is shifted to a jump mode. The operation signal is sent to the multiplexer 6 and is used as an exchange signal to change the next address to the jumping address. Also, the operation code decoder 3 inhibits the decoding operation of the decoder 4. Therefore, the jump address in the operand fields is set into the address register 5 through the multiplexer 6, and is not decoded in the decoder 4. At the next step, the memory 1 is accessed according to the jump address in the address register 5.

As described above, the jump address can not be set into the address register 5 before the jump operation code is decoded by the decoder 3 during the machine cycle in which the jump address is loaded into the instruction register 2. The jump address is set in the address register 5 after the decoding step and the multiplexing step. Therefore, the jump instruction cycle is very long, and other micro instructions for controlling a processing section cannot be executed during the jump instruction cycle.

FIG. 4 shows a block diagram of a part of another prior art data processor. This figure includes a sequence control circuit 15 for controlling the sequence of a processing flow and a processing circuit 16 for executing an arithmetic operation and a data transfer operation. The sequence control circuit 15 and processing circuit 16 are coupled to a micro instruction decoder 11 and are controlled by decoded output signals. Although the micro instruction decoder 11 as shown is a black box, it may includes a plurality of decoders as shown in FIG. 3(a). This decoder 11 decodes an operation code and an operand code and applies necessary signals to the sequence control circuit 15 and the processing circuit 16. A microprogram memory 9, a micro instruction register 10, an address register 12, a multiplexer 13 and a next address register 16 are the same circuits as the corresponding elements shown in FIG. 3(a). However, it is noted that the multiplexer 13 is controlled by the sequence control circuit 15. Namely, the decoded signal is directly used as a sequence control signal in FIG. 3(a), while a sequence control signal is transferred through the sequence control circuit according to decoded output in the FIG. 4.

FIG. 5 shows micro instruction formats for vertical type microprogramming, in which FIG. 5(a) shows a control instruction format for controlling the processing circuit 16 and FIG. 5(b) shows a jump instruction format used in the sequence control circuit 15. The control instruction has an operation code field containing an operation code for designating an operation for an arithmetic section or a data transfer section such as a peripheral interface circuit is and an operand field containing an operand used in the arithmetic or the data transfer section. The jump instruction has an operation code field containing a jump operation code and an operand field containing a jump address.

In the normal mode of operation, sequential addresses are set into the address register 12 during each machine cycle through the multiplexer 13. In this mode, when the instruction of FIG. 5(a) is accessed and loaded into the micro instruction register 10, the decoder 11 decodes the operation code and the operand code. The processing circuit 16 receives decoded signals and the operand and executes an operation designated by the decoded signals by using the operand. In this period, the sequence control circuit 15 may be actuated by the decoded signals. A next address is set in the address register 12 within this control instruction cycle.

When the jump instruction of FIG. 5(b) is accessed from the microprogram memory 9, the jump operation code and the jumping address are simultaneously loaded in the instruction register 10. At this state, the decoder 11 decodes the jump operation code and produces a jump operation control signal and a control signal to transfer the jump address to the multiplexer 13. The jump operation control signal is applied to the multiplexer 13 through the sequence control circuit 15 and the multiplexer 15 selects the jump address. Thereafter, the jump address is set in the address register 12. Then the normal mode is changed to a jump mode.

As described above, the processor in FIG. 4 also has the same shortcoming that the jump instruction executing speed is very slow, just as the processor of FIG. 3(a). Further, the described microprogramming needs three steps in each micro instruction execution; a reading step, a decoding step and an execution step. These three steps are also required for the jump instruction. However, in spite of the fact that the jump instruction is used only in the sequence control circuit, the processing unit executes no operation during this cycle. That is, the processing circuit 16 can not execute a control instruction and is held in an idle state. Therefore, execution efficiency of the processing circuit is very poor.

DETAILED DESCRIPTION OF THE PREFERRED EMBODIMENTS

FIG. 6 shows instruction formats of the present invention, in which FIG. 6(a) shows a control instruction (a normal instruction) for controlling a processing circuit such as an arithmetic circuit and a data transfer circuit and FIG. 6(b) shows a jump instruction used in a sequence control circuit for controlling the sequence of processing flow. In this figure, the control instruction and the jump instruction have two fields, that is a higher field H and a lower field L, and are shown as one example. The respective instruction may have more than two fields. A first operation code is set in the field H of the control instruction of FIG. 6(a), and a second operation code is set in the field H of the jump instruction of FIG. 6(b). The first and second operation codes designate operations of the processing circuit, and may be the same operation code such as a timing control code for input data applied at a high speed to the processor from an external machine. That is, operation codes for controlling the processing circuit are set in these two fields H. A BR bit in the field L of the control instruction is used to designate that a micro code in field L in another instruction which is to be read from the microprogram memory at the next step is a jump (or branch) address. For example, when the BR bit is "1", a micro code in the field L of a next micro instruction is a jump address, while if the BR bits is "0", the micro code in the field L of the next micro instruction is not a jump address but another operation code or an operand code. The field L except for the BR bit of the control instruction is used as a location to store a code for designating the kind of an arithmetic operation or a code for selecting a register. According to the present invention, the jump (or branch) instruction is divided into two parts, one of which is a jump (branch) operation part and the other is a jumping (branch) address part, and the jump operation part is set in the BR bit of a preceding micro instruction, while the jump (branch address) part is set in a field L of a following micro instruction.

FIG. 7 shows a principal block diagram of an embodiment of the present invention. The micro instruction shown in FIG. 6 is stored in a microprogram memory 21 together with other micro instructions and they are read out of the memory 21 according to addresses in a memory address register 25. A one word micro instruction register 22 is coupled to an output of the memory 21, and a one word instruction read from the memory 21 is loaded into the register 22. This register 22 includes two field H and L in which the field H corresponds to the field H of a micro instruction and the field L corresponds to the field L of the micro instruction. The field H of the register 22 is coupled to a decoder 23 for decoding a control operation code, while the field L of the register 22 is coupled to a decoder 24 and is also coupled to one input of a multiplexer 26. The other input of the multiplexer 26 is coupled to a next address register 28 storing a sequential address produced by an incrementer 27. The decoder 24 decodes the BR bit of a control instruction shown in FIG. 6(a). When the BR bit is "1", the decoder 24 produces an jump (branch) operation signal and transfers the jump operation signal to a flag register 29. The flag register 29 may be a flip-flop. The flag register 29 is set in response to the jump (branch) operation signal and sends an exchange signal to the multiplexer 26. The multiplexer 26 selects the jump (branch) address in the field L of the register 22. On the other hand, when the BR bit is "0", the decoder 24 resets the flag register 29.

A sequence for the operation of the processor in FIG. 7 will be described now.

In the normal mode, the address in the next address register 28 is sent to the address register 25 through the multiplexer 26. The memory 21 is accessed according to this address and transfers the accessed instruction to the instruction register 22. The instruction is loaded into the register 22 and an operation code of the field H is decoded by the decoder 23, while a BR bit and the remainder of the bits are decoded by the decoder 24. The decoder 23 produces an operation control signal and applies it to a processing circuit (not shown) and/or to the decoder 24. The processing circuit executes an instruction according to the operation control signal. In this case, the processing circuit may use the remainder of the bits in the field L. At the same time, the decoder 24 decodes the BR bit and produces the jump operation signal when the BR bit is "1", and the reset signal for resetting the flag register 29 when the BR bit is "0". In this period, the address used to access this instruction is incremented by the incrementer 27 and a next address is set into the next address register 28.

At the next step, the next address is set in the address register 25 and a next micro instruction shown in FIG. 6(b) is loaded into the instruction register 22. In this state, when the flag register 29 has been set at the preceding instruction cycle, the decoding operation of the decoder 24 is inhibited, and then a jump (branch) address of the field L is sent to the address register 25 through the multiplexer 26. Meanwhile, the operation decoder 23 decodes an operation code of the field H in FIG. 6(b) and produces an operating signal. Therefore, the processing circuit execute a given operation in parallel in the same cycle. That is, an operation of the processing circuit and an operation of the sequence control circuit (the decoder 24, the multiplexer 26 and the address register 25) can be simultaneously executed. The flag register 29 may be cleared after the jump address is set in the address register 25.

As described above, according to the present invention, since a part of the preceding instruction determines that a jump address of the following instruction is to be sent to the address register 25 and a selection of the multiplexer 26 is also accomplished, in the following instruction cycle a jump address is loaded into the instruction register 22, so that the decoding time for a jump operation is not required. Further, another instruction can be executed by a processing circuit at the same time when the jump address is set in the address register.

Moreover, a jump address occupies a large fraction of a one word instruction code, so that a one word instruction code length is necessarily long in the prior art instruction format. However, since a jump operation code and a jump address are independently set in the preceding instruction field and the following instruction field, with the present invention, the one word instruction code length can be short.

Furthermore, the BR bit may be more than one bit, and the jump operation code and the jump address may be set in an arbitrary field of an instruction format.

Figure 8A:
FIG. 8(a) is a control instruction format and FIG. 8(b) is a conditional jump (branch) instruction format of the present invention.
Figure 8B:
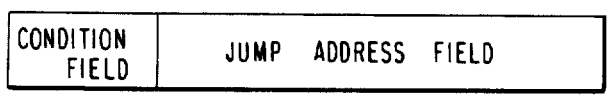

FIG. 8 shows the instruction format of another embodiment of the present invention, in which FIG. 8(a) shows a preceding control instruction including an operation field, an operand field and a jump (branch) bit, and FIG. 8(b) shows a following instruction including a condition field and a jump (branch) address field. The operation field of FIG. 8(a) is used to set an OP code for deciding the operation upon an operand in the operand field of FIG. 8(a). The operand in the operand field designates the type of the arithemetic operation or controls a control gate. The jump bit designates whether the following instruction is a jump (branch) instruction or not. The condition field of the conditional jump (branch) instruction of FIG. 8(b) is used to set a condition code for deciding a jump (branch) condition, and the jump address field is used to set a jump address for designating an address to be jumped to when the jump condition is satisfied.

Figure 9:
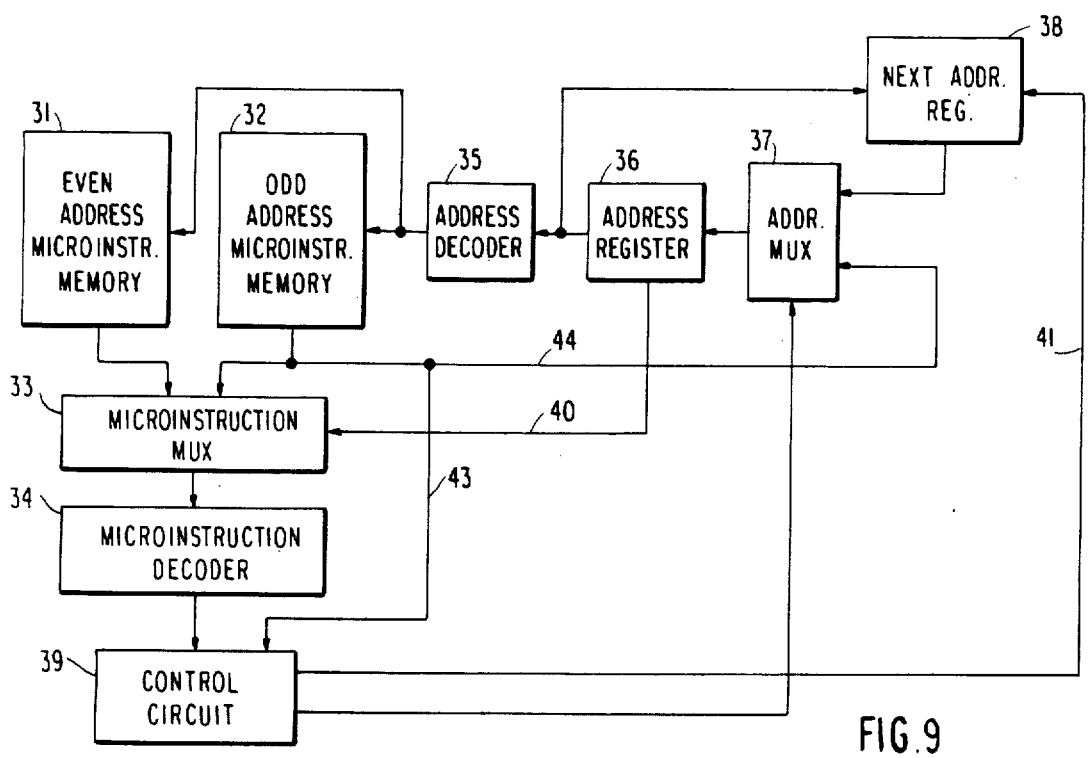
FIGS. 9, 10 and 11 are block diagrams of another embodiments of a part of a data processor according to the present invention.

FIG. 9 is a principal block diagram of another embodiment of the present invention for executing the instructions shown in FIG. 8. A microprogram memory unit has two memories, that is a first memory 31 accessed by even number addresses and a second memory 32 accessed by odd number addresses. These two memories are commonly accessed by an address decoder 35 and coupled to a micro instruction multiplexer 33. A micro instruction from the memories 31 and 32 is transferred through the multiplexer 33 to a micro instruction decoder 34. A control circuit 39 receives a decoded output from the decoder 34 and receives directly the micro code from the second memory 32. Therefore, the second memory 32 is coupled to both the multiplexer 33 and the control circuit 39. The control circuit 39 includes a sequence control section and a processing section. An input of the address decoder 35 is coupled to an output of an address register 36 to which an next address for sequential processing and a jump address are sent through an address multiplexer 37. The next address is produced by a next address register 38, while the jump address is sent from the second memory 32. An LSB (least significant bit) bit of the address register 36 is applied to the micro instruction multiplexer 33. Therefore, the address except for the LSB bit is transferred to the address decoder 35. Consequently, micro code at a 2N address of the first memory 31 and micro code at a 2N+1 address of the second memory 32 are simultaneously read out of the two memories 31 and 32. The multiplexer 33 selects one of the two micro codes according to the LSB bit. When the LSB bit is "0", the micro code of the first memory is selected, while a micro code of the second memory is selected when the LSB bit is "1". The content of the next address register is incremented by 1 or by 2 according to a control signal sent from the control circuit 39 on line 41.

In this processor, the memory accessing means consists of the multiplexer 33, the address decoder 35 and the address register 36. The instruction selecting control means consists of the micro instruction decoder 34, the address multiplexer 37, the next address register 38 and the control circuit 39. Further, a jump (branch) instruction shown in FIG. 8(b) is stored in the second memory 32 and is accessed by an odd number address.

In the normal mode, an address of the next address register 38 is set in the address register 36 through the multiplexer 37 and is decoded by the decoder 35. The address decoder 35 decodes the address except for the LSB bit 40 and simultaneously reads two instructions out of the first and the second memories 31 and 32. That is, a micro instruction read out of the first memory 31 corresponds to a preceding instruction, while a micro instruction read out of the second memory 32 corresponds to a following instruction. One of these two micro instructions is selected in the multiplexer 33 according to a content of the LSB bit 40. As described above, when the LBS is "0", a micro instruction of the first memory 31 is selected, while when the LSB is "1", a micro instruction of the second memory 32 is selected. A selected micro instruction is decoded by the instruction decoder 34 and applied to the control circuit 39.

As a result of the decoding, when the jump bit of FIG. 8(a) is "0", the content of the next address register 38 is incremented by 1 according to the control signal 41 of the control circuit 39. While, when the jump (branch) bit is "1", the decoder 34 determines that the simultaneously read out micro instruction 43 of the second memory 32 is a jump instruction. Therefore, the condition field 43 of FIG. 8(b) is received into the control circuit 39 in response to a decoded output signal. As the result, the control circuit 39 receives two micro instructions shown in FIG. 8(a) and (b) in the same cycle. The control circuit detects whether the jump condition in the condition field of FIG. 8(b) is satisfied or not by using a result of the operation code decoding of the operation field of FIG. 8(a). If the condition is satisfied, the control circuit 39 produces an exchange signal 42. Then, a jump address 44 is selected by the multiplexer 37 and is set in the address register through the multiplexer 37. In addition, the control circuit 39 sends a control signal 41 for incrementing the next address register 38 by 2 to the next address register 38. Consequently, the jump address is set in the address register, and thereafter a jump mode operation is sequentially executed.

According to this embodiment, two micro instructions designated by an even number address and an odd number address are simultaneously read out of the first and the second memories 31 and 32. When the micro instruction of the even number address has a jump code, the instruction decoder 34 determines that the micro instruction of the odd number address is a jump instruction. Consequently, a condition code of the jump instruction is sent to the control circuit 39. The control circuit 39 establishes a jump condition until the execution of the micro instruction of the even number address is finished, and selects either a next address of the next address register 38 or a jump address 44 of the jump address field by the exchange signal 42. Therefore, two micro instructions shown in FIG. 8(a) and (b) can be simultaneously executed at high speed.

In this embodiment, since the jump instruction of FIG. 8(b) is stored only in the second memory 32, the hardware design is very easy. However, it may be designed such that an instruction of FIG. 8(a) is stored in the second memory, while a jump instruction of FIG. 8(b) is stored in the first memory.

Figure 10:
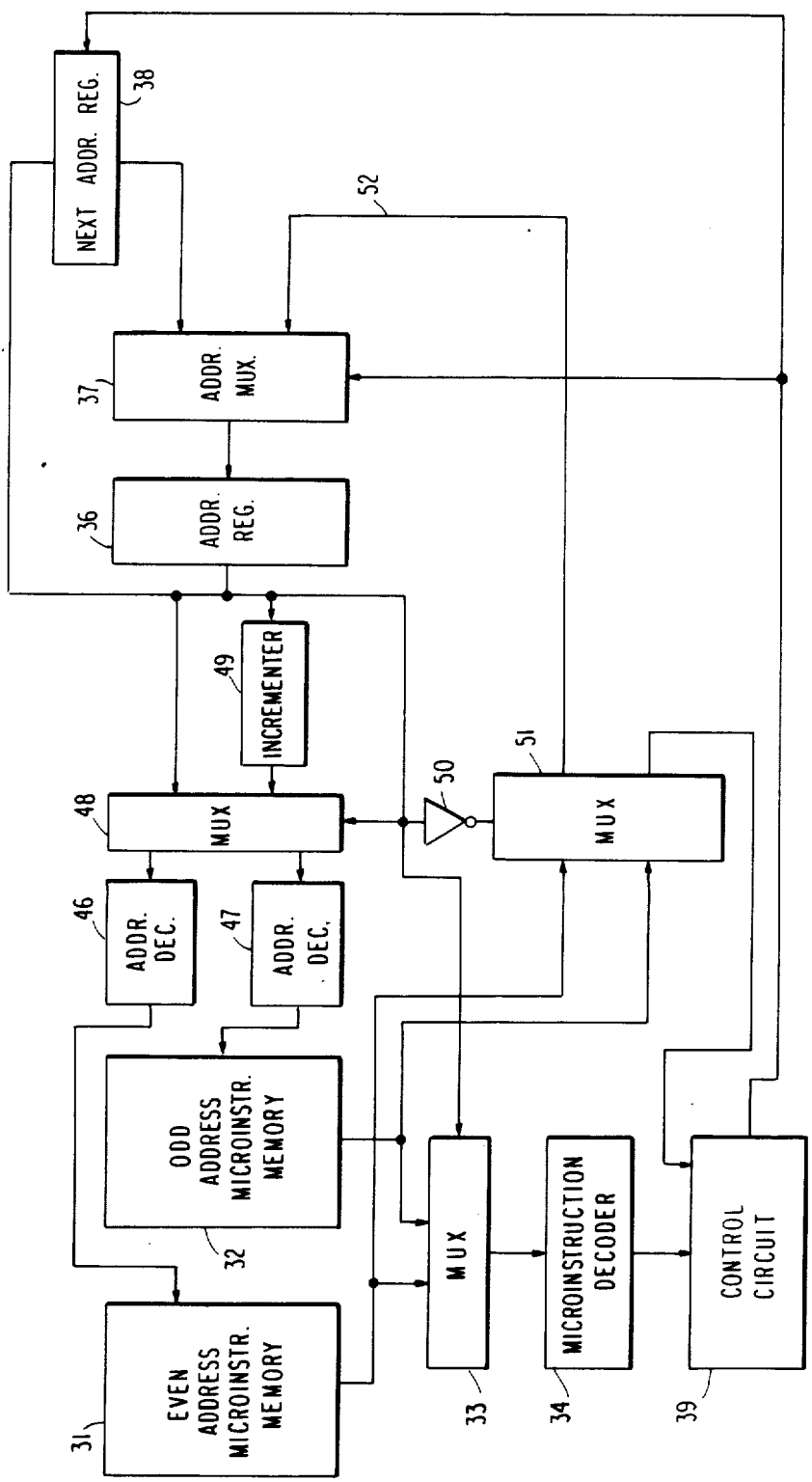

Further, the memory limitation can be relieved by the circuit design shown in FIG. 10. FIG. 10 includes two address decoders 46 and 47 which are coupled to the first memory 31 and the second memory 32, respectively, and two multiplexers 48 and 51. One input of the multiplexer 48 is directly coupled to the address register 36, while the other input of it is coupled to the address register 36 via an incrementer 49. The multiplexer 51 is coupled to its two inputs from the first and the second memories 31 and 32, respectively, and is coupled from its two outputs to the address multiplexer 37 and the control circuit 39, respectively. The multiplexer 51 selects an instruction which is not selected by the multiplexer 33. The multiplexer 48 sends an odd number address to the address decoder 47 and sends an output of the incrementer 49 to the address decoder 46. However, when the address register 36 outputs an even number address, the multiplexer 48 sends this address to the address decoder 46 and sends an output of the incrementer 49 to the address decoder 47.

In this embodiment, a memory access control means consists of the multiplexers 33 and 48, the address decoders 46 and 47, the address register 36 and the incrementer 49. Memory select control means consists of the micro instruction decoder 34, the multiplexers 37 and 51, the next address register 38 and the control circuit 39.

Now, it is assumed that the jump instruction is contained in the first memory (even number), and a control instruction of the second memory (odd) number) is currently executing. The control instruction is sent to the instruction decoder 34 through the multiplexer 33 and is decoded therein. The decoded outputs are sent to the control circuit 39. By the decoding, when a jump (branch) bit is "0", the next address register 38 is incremented by 1. On the other hand, when the jump (branch) bit is "1", the operation code and the operand code of the control instruction are sent to the control circuit 39. It is thus decided that a micro instruction selected by the multiplexer 51 is a jump instruction. The control circuit 39 detects whether a jump condition is satisfied or not. Then, the next address register 38 is incremented by 2. The multiplexer 37 selects an output (a jump code 52) from the multiplexer 51. This jump instruction is processed until the preceding control instruction is finished.

According to this embodiment, even if a jump instruction is contained in either the first memory 31 or the second memory 32, the jump instruction can be executed together with a preceding control instruction. Therefore, high speed processing and high processing efficiency can be achieved.

Figure 11:
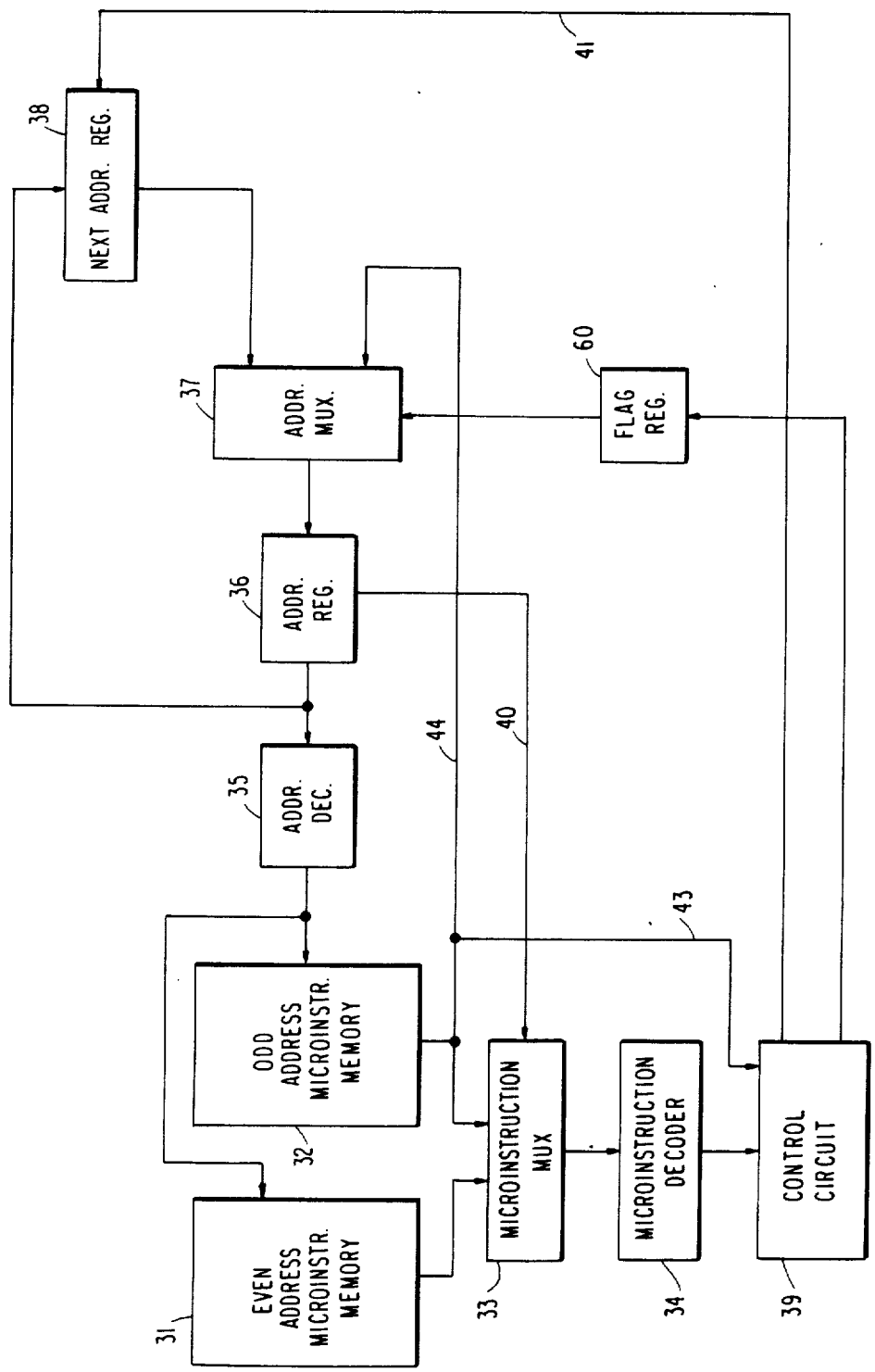

FIG. 11 is another embodiment of the present invention in which a flag register 60 is added between the address multiplexer 37 and the control circuit 39 of FIG. 9. That is, this embodiment combines FIG. 7 and FIG. 9. The control circuit 39 sets a "1" in the flag register 60 when a jump bit is "1". Then the address multiplexer 37 selects a jump address 44, while the next address register 38 is incremented by 2 according to a control signal 41. The flag register may be directly controlled by the decoder 34.

In this embodiment, since high speed processing and high processing efficiency can be obtained, objects of the present invention can be achieved.

What is claimed is:

1. An information processing apparatus having a sequence control function comprising a memory storing a plurality of instructions including a first type instruction containing an operation code and a control code which designate a jump operation and a second type instruction containing a jump address, a memory access circuit coupled to said memory and applying a first address for reading said first type instruction out of said memory and thereafter applying a second address subsequent to said first address for reading said second type instruction out of said memory, a decoder coupled to said memory and decoding said operation code and said control code in said first type instruction, simultaneously, to generate a jump operation signal according to said control code, and a sequence control circuit coupled to said memory and said decoder and extracting said jump address from said second type instruction which is read out of said memory by said second address, said sequence control circuit applying said jump address to said memory.

2. An information processing apparatus as claimed in claim 1, in which said memory access circuit has a sequential address generator generating said first address, said second address and a third address subsequent to said second address, said sequence control circuit having a multiplexer which receives said third address and said jump address in said second type instruction and selects said jump address when said jump operation signal is generated from said decoder and said third address when said jump operation signal is not generated, respectively.

3. An information processing apparatus as claimed in claim 1, in which said decoder has a first decoding section receiving said operation code in said first type instruction and decoding said operation code to produce at least one control signal used in an operation different from said jump operation and a second decoding section receiving said control code in said first type instruction and decoding said control code to generate said jump operation signal during a period when said operation code in said first type instruction is decoded in said first decoding section.

4. An information processing apparatus having a sequence control function comprising a first memory storing a first type instruction containing an operation code and a control code designating a jump operation, a second memory storing a second type instruction containing a jump address, an addressing circuit coupled to said first memory and said second memory in common for simultaneously reading said first type instruction and said second type instruction out of said first memory and said second memory, respectively, a control circuit coupled to said first memory and producing at least one first control signal according to said operation code in said first type instruction and a second control signal according to said control code in said first type instruction, and a sequence circuit coupled to said second memory, said control circuit and said addressing circuit and applying said jump address in said second type instruction to said addressing circuit in response to said second control signal, said addressing circuit applying said jump address to said first memory and said second memory in common when said jump address is received from said sequence circuit.

5. An information processing apparatus as claimed in claim 4, in which said second type instruction further contains a condition code which determines whether said jump operation is allowed or not, said second memory coupling to said control circuit for applying said condition code to said control circuit, and said control circuit generating said second control signal when said control code in said first type instruction is applied to said control circuit and when said jump operation is allowed by said condition code is said second type instruction.

6. An information processing apparatus comprising a first memory storing a first instruction containing a control code, a second memory storing a second instruction, a first means coupled to said first memory and said second memory for reading said first instruction and said second instruction simultaneously out of said first memory and said second memory, respectively, a second means for decoding said first instruction and said second instruction, a third means operatively coupling said second means to either said first memory or said second memory, a fourth means coupled to said second means for generating a jump operation signal according to said control code in said first instruction, and a fifth means coupled to said second memory, said first means and said fourth means for applying at least one portion of said second instruction as a jump address to said first means when said jump operation signal is generated from said fourth means.

7. An information processing apparatus as claimed in claim 6, further comprising a sixth means for coupling said second memory to said fourth means, said second instruction containing an address code and a condition code which determines whether a jump operation is allowed or not, said fourth means generating said jump operation signal when said control code in said first instruction and when the jump operation is allowed by said condition code in said second instruction, and said address code in said second instruction being applied to said first means as said jump address.

8. An information processing apparatus executing a plurality of operations containing a jump operation according to a program comprising a memory means for storing a first instruction containing an operation code designating an operation other than said jump operation and a control code designating said jump operation at a first location and a second instruction at a second location different from said first location, a memory access means coupled to said memory means for reading said first instruction and said second instruction out of said memory means, respectively, a selecting means coupled to said memory means for selecting either said first instruction or said second instruction, a decoding means coupled to said selecting means for decoding means generating a control signal or signals to be used to execute said operation other than said jump operation according to said operation code of said first type instruction and a first signal according to said control code of said first type instruction when said first type instruction is selected by said selecting means, a control means coupled to said memory means and said decoding means for generating a second signal designating said jump operation when said first signal is applied thereto and when said second type instruction contains a condition code to allow an execution of said jump operation and a jump address, and means coupled to said memory means and said control means for applying said jump address contained in said second type instruction to said memory means according to said second signal from said control means.

* * * * *

UNITED STATES PATENT AND TRADEMARK OFFICE
CERTIFICATE OF CORRECTION

PATENT NO. : 4,674,063
DATED : June 16, 1987
INVENTOR(S) : Yoshikuni Sato

It is certified that error appears in the above-identified patent and that said Letters Patent is hereby corrected as shown below:

COLUMN 5, LINE 20   After "code" delete "of" insert --in--
COLUMN 5, LINE 24   After "address to the" delete "jumping" insert --jump--

Signed and Sealed this

Twenty-fourth Day of May, 1988

Attest:

DONALD J. QUIGG

Attesting Officer

Commissioner of Patents and Trademarks